(12) United States Patent
Ante et al.

(10) Patent No.: US 8,752,368 B2
(45) Date of Patent: Jun. 17, 2014

(54) DIAGNOSTIC METHOD AND DIAGNOSTIC SYSTEM FOR A PARTICLE FILTER OF AN INTERNAL COMBUSTION ENGINE, IN PARTICULAR FOR A SOOT FILTER IN A DIESEL MOTOR VEHICLE

(75) Inventors: Johannes Ante, Regensburg (DE); Manfred Weigl, Viehhausen (DE)

(73) Assignee: Continental Automotive GmbH, Hannover (DE)

( * ) Notice: Subject to any disclaimer, the term of this patent is extended or adjusted under 35 U.S.C. 154(b) by 353 days.

(21) Appl. No.: 12/933,474

(22) PCT Filed: Mar. 18, 2009

(86) PCT No.: PCT/EP2009/053175
§ 371 (c)(1),
(2), (4) Date: Sep. 20, 2010

(87) PCT Pub. No.: WO2009/115542
PCT Pub. Date: Sep. 24, 2009

(65) Prior Publication Data
US 2011/0005198 A1   Jan. 13, 2011

(30) Foreign Application Priority Data
Mar. 20, 2008   (DE) .......................... 10 2008 015 256

(51) Int. Cl.
  *F01N 3/00*   (2006.01)
(52) U.S. Cl.
  USPC ................... 60/297; 60/274; 60/276; 60/278; 60/285; 65/283; 65/DIG. 30

(58) Field of Classification Search
  USPC ........... 60/274, 276, 277, 285, 295, 297, 311; 55/283, 466, DIG. 30
  See application file for complete search history.

(56) References Cited

U.S. PATENT DOCUMENTS

| | | | |
|---|---|---|---|
| 7,568,376 B2 * | 8/2009 | Strohmaier et al. | 73/23.21 |
| 7,677,032 B2 * | 3/2010 | Berryhill et al. | 60/297 |
| 7,772,855 B2 * | 8/2010 | Sakuma et al. | 324/693 |
| 7,866,146 B2 * | 1/2011 | Konstandopoulos | 60/311 |
| 8,091,408 B2 * | 1/2012 | Baars et al. | 73/23.31 |
| 8,151,560 B2 * | 4/2012 | Zanini-Fisher et al. | 60/297 |
| 8,261,540 B2 * | 9/2012 | Konstandopoulos et al. | 60/297 |
| 8,327,696 B2 * | 12/2012 | Baars et al. | 73/114.69 |
| 2008/0000218 A1 | 1/2008 | Handler et al. | |

FOREIGN PATENT DOCUMENTS

| | | |
|---|---|---|
| DE | 10 2006 057528 | 6/2007 |
| DE | 10 2006 029990 | 1/2008 |
| JP | 2005-325812 A | 11/2005 |

* cited by examiner

Primary Examiner — Binh Q Tran
(74) Attorney, Agent, or Firm — Cozen O'Connor

(57) ABSTRACT

A diagnostic method is provided for a particle filter arranged in exhaust-gas flow of an internal combustion engine. A particle concentration is detected by a particle sensor positioned downstream of the particle filter. The combustion-relevant engine parameters are briefly changed by an engine controller in such a way that an untreated emissions concentration from the engine is significantly increased. A filter fault message is output if the detected associated measurement values of the particle concentration exceed a detection threshold value of the particle sensor, which is in particular considerably greater than a predefined, preferably volume-related particle limit value.

12 Claims, 2 Drawing Sheets

DIAGNOSTIC METHOD AND DIAGNOSTIC SYSTEM FOR A PARTICLE FILTER OF AN INTERNAL COMBUSTION ENGINE, IN PARTICULAR FOR A SOOT FILTER IN A DIESEL MOTOR VEHICLE

PRIORITY CLAIM

This is a U.S. national stage of Application No. PCT/EP2009/053175, filed on Mar. 18, 2009, which claims priority to German Application No: 10 2008 015 256.0, filed: Mar. 20, 2008 the contents of which are incorporated herein by reference.

BACKGROUND OF THE INVENTION

1. Field of the Invention

The invention relates to a diagnostic method for a particle filter which is arranged in the exhaust gas stream of an internal combustion engine, a particle concentration being sensed by a particle sensor which is connected downstream of the particle filter.

Furthermore, the invention relates to a diagnostic system for a particle filter which is arranged in the exhaust gas stream of an internal combustion engine. The diagnostic system has an engine controller for setting combustion-relevant engine parameters as a function of different operating modes and for outputting at least one filter fault message. Furthermore, it has a particle sensor which is connected downstream of the particle filter in order to sense a particle concentration.

Furthermore, the invention relates to a suitable use of the diagnostic system according to the invention.

2. Related Art

An internal combustion engine is preferably a diesel engine. As an alternative, the internal combustion engine can be a gasoline engine or a gas-operated internal combustion engine. The internal combustion engine is typically provided for driving a motor vehicle, such as a passenger car. As an alternative, the internal combustion engine can be provided for steady-state operation, for example in an installation. In particular, the particle filter is a soot filter for diesel soot, and the particle sensor is a soot sensor.

The current particulate matter discussion for keeping the air clean has led vehicle producers to provide soot particle filters, in vehicles operated by diesel engine. To this end, an on-board diagnosis of all the emissions-relevant components of the vehicle is required. Corresponding malfunctions are entered in a fault memory of the vehicle. The owner of the vehicle is optionally advised to have his vehicle checked or repaired in a repair shop.

A differential pressure measurement is known from the prior art for monitoring the correct function of a particle filter. However, particle sensors are also known which are connected behind the particle filter and output a measured value which corresponds to the particle concentration in the exhaust gas stream at that point.

The maximum permissible particle concentrations behind the particle filter which are usually prescribed by law are extremely low and require a considerable outlay on measuring technology. Thus highly accurate particle sensors are required for future diesel systems in order to adhere to the EURO 5 limit values of less than 5 mg/km which correspond approximately to a volume-related limit value of 2 $mg/m^3$. Sensors of this type have to have a detection threshold value which lies in the range of the volume-related limit value. In particular, a high absolute accuracy is required. In order, in addition, to take a sensor-dependent zero point drift and cross sensitivity into consideration in terms of measuring technology, the currently available particle sensors would have to have a considerably lower detection threshold value, such as 0.5 $mg/m^3$. However, particle sensors with a high measuring resolution of this type are very expensive.

SUMMARY OF THE INVENTION

It is therefore an object of the invention to specify a diagnostic method which can be operated more economically than in the prior art.

It is a further object of the invention to specify a diagnostic system which corresponds to the method.

Finally, it is an object of the invention to specify a suitable use of the diagnostic system according to the invention.

According to one embodiment of the invention, the combustion-relevant engine parameters are changed temporarily by an engine controller in such a way that an engine-side raw-emission concentration rises significantly. A filter fault message is output if the sensed associated measured values of the particle concentration exceed a detection threshold value of the particle sensor, which detection threshold value is greater than a predefined, preferably volume-related particle limit value.

"Significant" is defined as a response of the particle sensor that can be sensed satisfactorily in terms of measuring technology. The engine parameters are preferably changed in such a way that the engine-side raw-emission concentration rises more or less suddenly or in a ramp-shaped manner. As an alternative to the volume-related limit value, a mass-related or kilometer-related limit value or else a limit value without further bench marks can be used.

The engine controller is preferably an electronic processor-assisted control unit which has signal inputs and signal outputs. The signal inputs serve, inter alia, to sense a current air quantity, an engine temperature, a rotational speed, a setpoint value predefined by the accelerator pedal, a concentration value sensed by the particle filter, and the like. The signal outputs serve, inter alia, for actuating injection valves, an air quantity restrictor and a nonreturn valve for setting the degree of exhaust gas recirculation back into the engine.

The combustion-relevant engine parameters are, in particular, the air mass flow, the torque, the temperature, the degree of exhaust gas recirculation and the like. On the basis of these parameters, the engine controller can computationally determine the raw-emission concentration to be expected in the engine-side exhaust gas stream, that is to say the raw-emission concentration directly at the outlet of the engine, as a function of a respective operating mode or a corresponding operating mode change.

It is a basic concept of the present invention that a forced or already present engine-side emission of particles which is greatly increased and, in particular, is initiated by the driver is used to test the particle filter connected behind it. If the particle filter is defective, there is a likewise greatly increased particle concentration downstream of the particle filter, for the detection of which a much less sensitive and therefore less expensive particle sensor than in the prior art can then advantageously be used.

A brief emission of particles of this type should have a raw-emission concentration which lies at a concentration value which is from 10 to 100 times, preferably from 50 to 100 times higher than a largely optimized part-load mode. Here, the currently available particle filters are capable of also filtering out a greatly increased emission of particles of this type, with the result that the particle concentration behind the particle filter still lies considerably below permissible legal guidelines. According to the invention, the particle sensor therefore has to have only a detection threshold value which is still sufficient for reliable detection precisely of a greatly increased emission of particles of this type in the case of a defective particle filter. The detection threshold value can then have a detection threshold value which is at least 10 times higher, such as 5 mg/m$^3$, in comparison with conventional expensive particle sensors.

According to one embodiment of the diagnostic method according to the invention, the combustion-relevant engine parameters are changed in a largely steady-state part-load mode. As a result, a particularly great rise in a very short time is possible from a comparatively small raw-emission concentration value to a test concentration value which is higher by many times.

A "normal" steady-state part-load mode means that the vehicle is not accelerated or is accelerated only moderately, the pollutant emission then being comparatively low as a result of the largely optimum combustion of the fuel which is possible in this mode.

The rise in the measured signal is typically temporally shifted slightly with respect to the rise in the raw-emission concentration. The time shift is usually less than 1 second. A "temporary" change in the combustion-relevant engine parameters means a time period of less than one second, in particular a few tenths of a second. However, the time period should be dimensioned such that a sufficient emission peak can be produced on the engine side, which emission peak, however, at the same time is also so short that the driving operation is not impaired substantially, such as in the form of a brief acceleration. The engine parameters are preferably changed temporarily and repeatedly to regularly check the particle filter, in particular at regular intervals, in order to force an emission surge as long as the currently prevailing engine parameters allow it. The time values between emission surges of this type typically lie in the region of approximately 10 minutes. Depending on the monitoring requirement, they can also take place at shorter time intervals, such as at intervals of five minutes, or else at longer time intervals, such as at intervals of half an hour or several hours. As an alternative or in addition, the emission surges can be triggered as a function of the kilometers driven, such as every 1000 km.

Another object of the present invention is achieved by a diagnostic method, in which the internal combustion engine is monitored for an operating state, in which an engine-side raw-emission concentration increases significantly. A filter fault message is then output if the sensed associated measured values of the particle concentration exceed a detection threshold value of the particle sensor, which detection threshold value is, in particular, considerably greater than a predefined, preferably volume-related particle limit value.

In comparison with the previously mentioned forced emission surge, here the engine controller waits in a targeted manner for an emission surge of this type, as can occur in the case of pronounced acceleration operations. In particular, an operating mode of this type is a mode at high load, in particular a full-load mode. If a load case of this type is sensed, such as, inter alia, as a result of the accelerator pedal being depressed completely by the driver, the measured signal from the particle sensor is examined for a significant rise in a temporally correlated manner thereto. In this case, there is then probably a defective particle filter.

According to a further embodiment of the diagnostic method, the particle limit value is based on an exhaust gas limit value of a relevant exhaust gas standard, which limit value is distance-based for the type of internal combustion engine. A value of this type can be stored, for example, in a memory of the engine controller. Usually, different exhaust gas limit values for the respective engine type are specified. For instance, this is now only 5 mg/km for a diesel engine according to the new EURO 5 standard. This exhaust gas limit value is then converted into a value which is a function of the exhaust gas quantity and lies approximately in the region of 2 mg/m$^3$ depending on the degree of exhaust gas recirculation back into the engine compartment. This value results computationally from the fact that an exhaust gas quantity of approximately 25 m$^3$ is emitted for an environmentally relevant reference journey of 11 km. Converted to a cubic meter, the mass of the pollutant particles is 55 mg: 25=2.2 mg. As an alternative, other exhaust gas limit values can also be used, which are usually mass-related or distance-related. They are dependent on regional or national exhaust gas standards.

Furthermore, the object of the invention is achieved by a diagnostic system which corresponds to the diagnostic method. In this case, the engine controller is configured for carrying out one of the two diagnostic methods according to the invention or both diagnostic methods according to the invention. Furthermore, the particle sensor has a detection threshold value which is, in particular, considerably greater than a predefined, in particular volume-related particle limit value.

The engine control is, in particular, software routines which replicate the individual method steps of the diagnostic methods according to the invention and are executed by a microprocessor or microcontroller.

A diagnostic system of this type can advantageously be used in a diesel motor vehicle.

According to one embodiment of the diagnostic system, the detection threshold value of the particle sensor lies between 2 and 20 times, in particular between 5 and 10 times the predefined particle limit value. Particle sensors of this type are considerably less expensive than presently available particle sensors having a detection threshold value of better than 1 mg/m$^3$.

In particular, the particle filter is a soot filter and the particle sensor is a soot sensor. It is precisely the soot particles which are considered to be particularly critical with regard to the loading of the environment with particulate matter.

The diagnostic system according to the invention can be used particularly advantageously in a motor vehicle, in particular in a diesel motor vehicle.

BRIEF DESCRIPTION OF DRAWINGS

In the following text, the invention and advantageous embodiments of the invention will be described in greater detail using the following figures, in which.

DETAILED DESCRIPTION OF THE DRAWINGS

Figure 1:
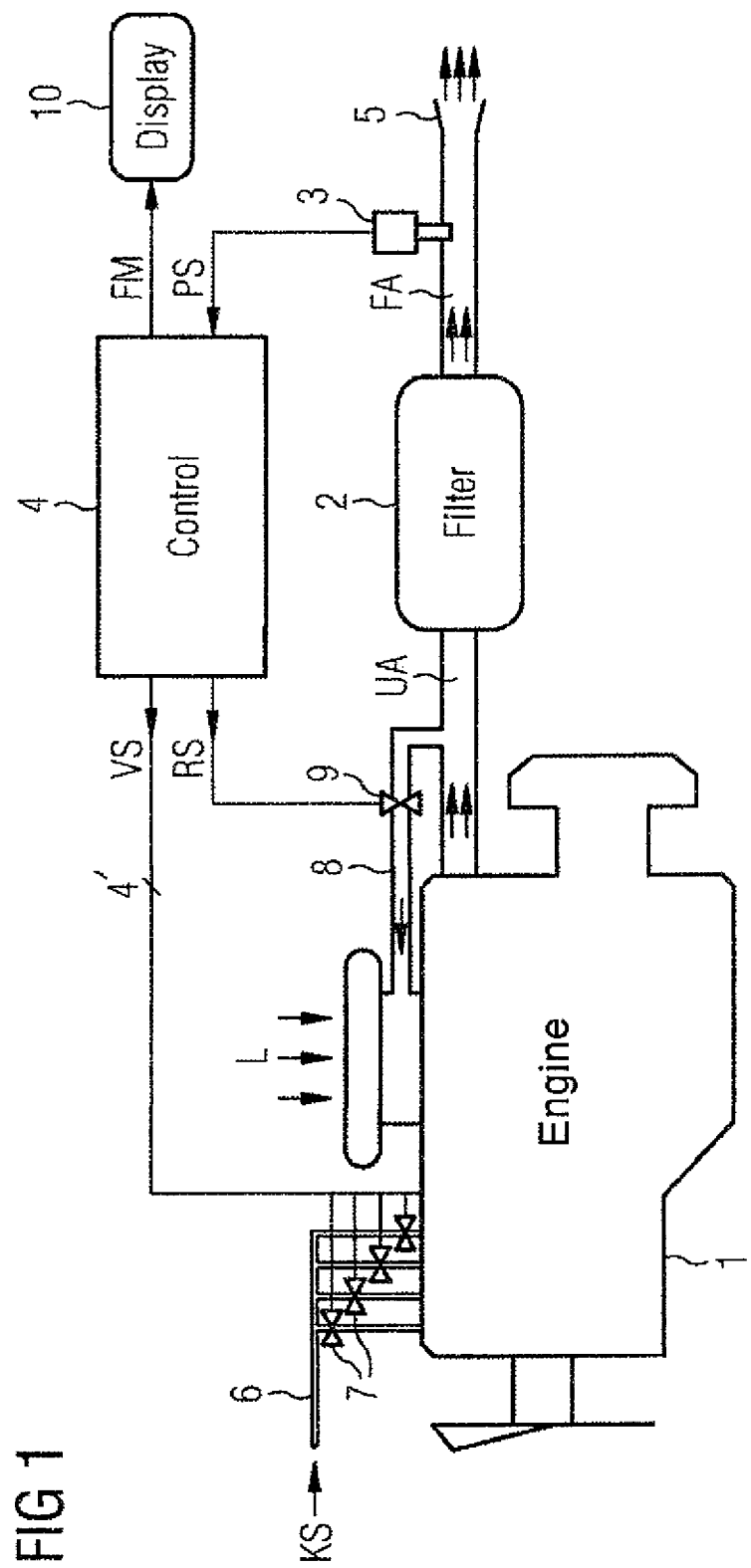
FIG. 1 is a diagram of a diagnostic system for a motor vehicle.

FIG. 1 is a diagram of a diagnostic system for a particle filter 2 which is arranged in the exhaust gas stream UA of an internal combustion engine 1. The internal combustion engine 1 which is shown is a diesel engine which is provided for driving a diesel motor vehicle. Fuel KS is fed to the engine 1 via a fuel line 6. The designation 7 denotes injection valves which can be actuated by an engine controller 4 via actuating lines 4' for injecting part of the fuel KS into the respective cylinders. VS denotes the corresponding actuating signal.

Furthermore, the designation L denotes air which is drawn in by the engine 1 for combustion of the fuel KS. Furthermore, a particle filter 2, in particular a soot filter, is connected in the engine-side exhaust gas stream UA. The designation FA denotes the filtered exhaust gas stream. A particle sensor 3, in particular a soot filter, is arranged in said exhaust gas stream FA. Finally, there is a tail pipe which is denoted by the designation 5 at the end of the exhaust gas section.

The particle sensor 3 is provided for sensing a particle concentration FW. A filter or sensor signal PS which corresponds with the former, is fed to the engine controller 4. Furthermore, there is, by way of example, an exhaust gas recirculation valve 9 which can likewise be actuated by the engine controller 4. The designation RS denotes an associated exhaust gas recirculation valve actuating signal. Via said signal RS, the degree of exhaust gas recirculation 8 from the unfiltered exhaust gas stream UA back into the engine compartment can be set. The designation FM denotes a filter fault message which can be output on a display 10. The display can be, for example, an electronic display, preferably what is known as a display for on-board diagnosis.

In the example of FIG. 1, the combustion-relevant engine parameters are a fuel quantity which can be injected via the injection valves 7 and the degree of exhaust gas recirculation in the circuit of the exhaust gas recirculation 8. Moreover, the engine 1 can have a controllable air throttle valve (not shown in further detail), in order to set the required air quantity for the internal combustion engine 1 during operation. Finally, the engine controller 4 has a device for carrying out the diagnostic methods according to the invention. The device can be configured for carrying out one of the two diagnostic methods according to the invention or else both diagnostic methods depending on the operating mode. For instance, the engine controller 4 can preferably carry out the diagnostic method, in order to wait for emission surges initiated by the driver for testing the particle filter 2. Only after a relatively long time period has passed without filter testing can an emission surge then be forced by the engine controller according to the diagnostic method.

Figure 2:
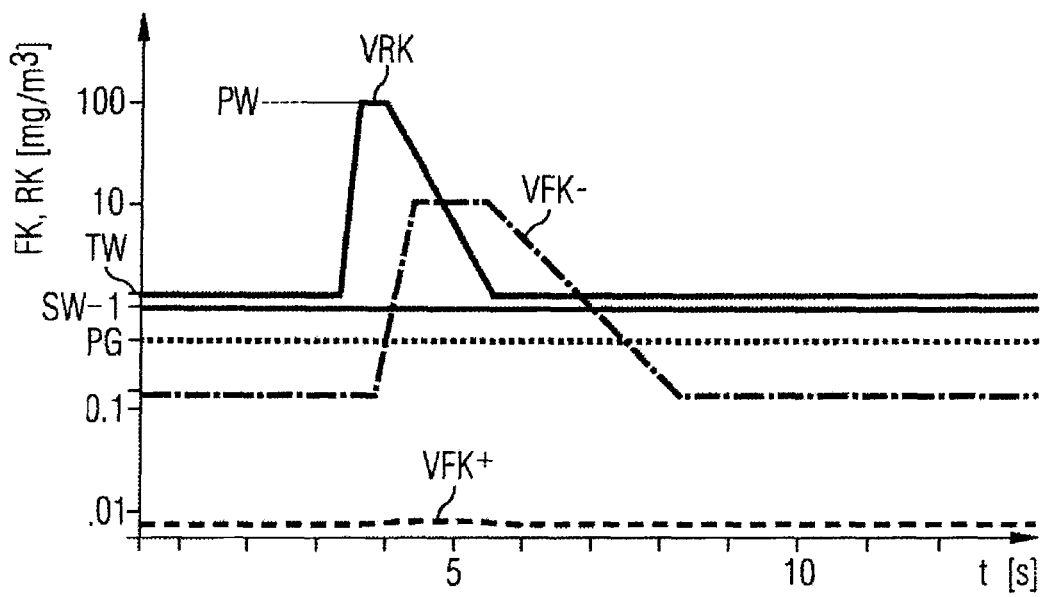
FIG. 2 is a time diagram with plotted profiles of different particle concentrations.

FIG. 2 shows a time diagram with different time profiles of particle concentrations FK, RK. The designation FK denotes a filter-side particle concentration, measured in $mg/m^3$, which is sensed by the particle sensor 3. RK denotes an engine-side raw-emission concentration which is present in the unfiltered exhaust gas stream UA, directly at the outlet of the engine 1. The raw-emission concentration RK therefore corresponds to the unfiltered particle concentration. Both particle concentrations FK, RK are plotted logarithmically.

VRK shows the time profile of the raw-emission concentration RK plotted against a time axis t. As the diagram shows, the raw-emission concentration RK rises significantly after approximately 3 seconds, in particularly suddenly, from a raw-emission concentration value TW in a steady-state part-load mode to a test concentration value PW which is, by way of example, 100 times higher. This rise can be achieved, for example, by the targeted temporary change in the combustion-relevant engine parameters, such as by a sudden increase in the injected fuel quantity which then cannot be burned completely. As an alternative or in addition, it can be achieved by a sudden maximum recirculation of the unfiltered exhaust gas stream UA back into the engine compartment for "repeated" combustion. A cause for a greatly excessive emission rise of this type is the incomplete combustion of the injected fuel on account of the missing air oxygen with an associated formation of soot. The latter can be seen, in particular in vehicles without a particle filter, by the fact that a black exhaust gas cloud can be seen at the tail pipe of the vehicle. The emission ejection which rises by way of example in the region of just under a second can also alternatively occur during the usual driving operation. An emission surge of this type typically occurs when the driver "floors" the accelerator pedal completely from a part load mode, in order to accelerate the vehicle as quickly as possible.

The designation VFK+ shows a particle concentration in the case of an intact particle filter 2, which particle concentration increases only unsubstantially with a slight time shift, in particular in a region of less than 1 second. Here, the logarithmically plotted particle concentration FK rises only to a minimum extent and remains below the detection limit.

If, in contrast, the particle filter 2 is defective, such as a honeycomb fracture, a still considerable part of the unfiltered particles, such as 10%, can rest on the particle filter 2. The dash-dotted profile VFK− shows this, which shows the particle concentration FK behind the defective particle filter 2. As FIG. 2 shows, the particle concentration FK which is measured by the particle sensor 3 is temporally correlated with the emission surge according to the profile VRK. In the present example, the time shift is less than 1 second.

According to one embodiment of the invention, a filter fault message FM is then output if the sensed associated measured values of the particle concentration FK exceed a detection threshold value SW of the particle sensor 3, which detection threshold value SW is, in particular, considerably greater than a predefined, preferably volume-related particle limit value PG. Both limit values SW, PG are plotted in the example of FIG. 2.

Figure 3:
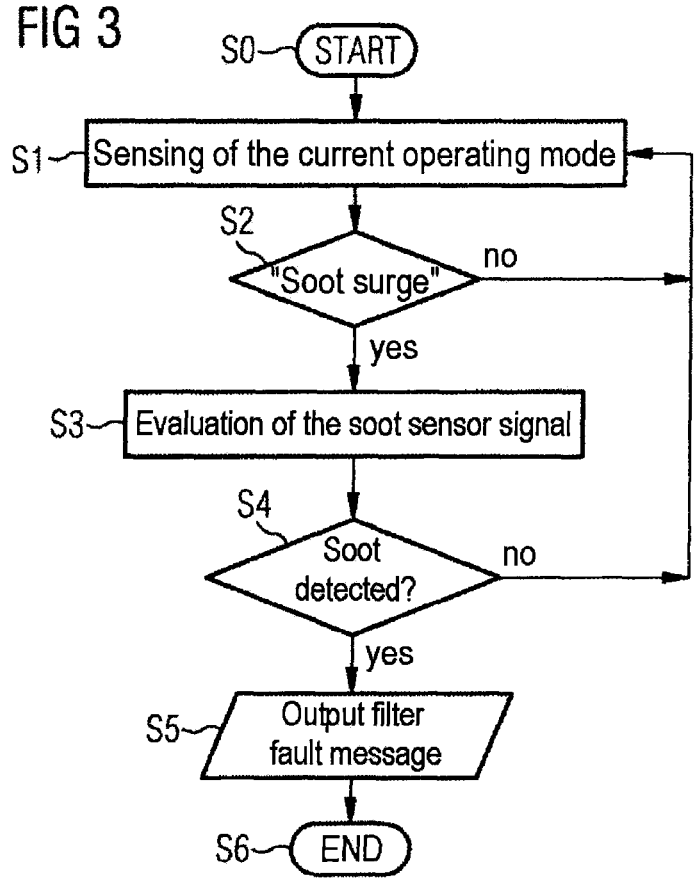
FIG. 3 is a flow chart of the method.

FIG. 3 a flow chart of the diagnostic method according to the invention. In the method step S0, parameterization or calibration typically takes place of the components which are essential for the diagnostic method, such as the particle sensor. In the following method step S1, the internal combustion engine is monitored by the engine controller for an operating state, in which an engine-side raw-emission concentration increases significantly. If this is not the case, a branch back to the step S2 is followed. Otherwise, a measurement of the filter-side particle concentration takes place in the step S3 by the particle sensor in a temporally correlated manner. If a significant signal rise of the particle sensor signal PS can then be detected according to the following step S4, a fault message FM is output in the following step S5. S6 denotes the end of the method according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A diagnostic method for a particle filter arranged in an exhaust gas stream of an internal combustion engine, the method comprising:

sensing a particle concentration by a particle sensor connected downstream of the particle filter;
temporarily changing a combustion-relevant engine parameter comprising at least one of a supplied fuel quantity and a degree of exhaust gas recirculation in an exhaust gas recirculation circuit by an engine controller to increase an engine-side raw-emission concentration; and
sensing associated measured values of the particle concentration;
determining if the sensed particle concentration values exceed a detection threshold value of the particle sensor, which detection threshold value is greater than a predefined, volume-related particle limit value; and
outputting a filter fault message if the sensed associated measured values of the particle concentration exceed the detection threshold value of the particle sensor.

2. The diagnostic method as claimed in claim 1, wherein the combustion-relevant engine parameters are changed in a substantially steady-state part-load mode.

3. The diagnostic method as claimed in claim 1, wherein the volume-related particle limit value is based at least in part on an exhaust gas limit value of a relevant exhaust gas standard, which limit value is distance-based for a given type of internal combustion engine.

4. A diagnostic system for a particle filter which is arranged in the exhaust gas stream of an internal combustion engine, comprising:
an engine controller for setting a combustion-relevant engine parameters as a function of different operating modes and for outputting at least one filter fault message;
a particle sensor arranged downstream of the particle filter to sense a particle concentration,
wherein the engine controller is configured to:
temporarily change combustion-relevant engine parameter comprising at least one of a supplied fuel quantity and a degree of exhaust gas recirculation in an exhaust gas recirculation circuit to increase an engine-side raw-emission concentration; and
sense associated measured values of the particle concentration;
determine if the sensed particle concentration values exceed a detection threshold value of the particle sensor, which detection threshold value is greater than a predefined, volume-related particle limit value; and
output a filter fault message if the sensed associated measured values of the particle concentration exceed the detection threshold value of the particle sensor.

5. The diagnostic system as claimed in claim 4, wherein the detection threshold value of the particle sensor lies between about 2 and 20 times the predefined volume-related particle limit value.

6. The diagnostic system as claimed in claim 5, wherein the particle filter is a soot filter, and in that the particle sensor is a soot sensor.

7. The diagnostic system as claimed in claim 4, wherein the internal combustion engine is a diesel motor.

8. The diagnostic system as claimed in claim 5, wherein the detection threshold value of the particle sensor lies between 5 and 10 times the predefined volume-related particle limit value.

9. The diagnostic system as claimed in claim 5, wherein the particle filter is a soot filter, and in that the particle sensor is a soot sensor.

10. The diagnostic system as claimed in claim 8, wherein the particle filter is a soot filter, and in that the particle sensor is a soot sensor.

11. The diagnostic system as claimed in claim 4, wherein the internal combustion engine is a gasoline motor.

12. The diagnostic method as claimed in claim 1, wherein the engine-side raw-emission concentration increase is one of suddenly and ramp shaped.

\* \* \* \* \*